United States Patent [19]

Walter et al.

[11] 4,099,913
[45] Jul. 11, 1978

[54] FOAMS FOR TREATING FABRICS

[75] Inventors: Andrew Tainter Walter; George Macon Bryant, both of Charleston; Ronald Louis Readshaw, South Charleston, all of W. Va.

[73] Assignee: Union Carbide Corporation, New York, N.Y.

[21] Appl. No.: 670,380

[22] Filed: Mar. 25, 1976

[51] Int. Cl.² ............................ D06B 1/04; D06P 1/16
[52] U.S. Cl. ........................................ 8/173; 252/8.6; 8/18 R; 8/21 R; 8/79; 8/115.6; 8/166; 8/169
[58] Field of Search ................. 8/173, 169, 79, 115.6, 8/18 R, 166, 21 R; 252/8.6

[56] References Cited

U.S. PATENT DOCUMENTS

| | | | |
|---|---|---|---|
| 2,056,449 | 10/1936 | Graenacher et al. | 8/84 |
| 2,677,700 | 5/1954 | Jackson et al. | 260/30.8 |
| 2,971,458 | 2/1961 | Kumins et al. | 8/62 |
| 3,697,314 | 10/1972 | Stritzko | 8/19 |
| 3,762,860 | 10/1973 | Abrahams | 8/21 A |

FOREIGN PATENT DOCUMENTS

| | | | |
|---|---|---|---|
| 1,406,665 | 9/1972 | United Kingdom | 8/169 |
| 1,371,781 | 9/1971 | United Kingdom | 8/169 |

Primary Examiner—John Kight, III
Attorney, Agent, or Firm—Francis M. Fazio

[57] ABSTRACT

Foams containing a functional textile treating compound for application to a substrate such as a fabric or textile. The use of foams enables the application in uniform manner of many functional compositions that can be used in the treatment of a textile fabric to improve its properties. The foam compositions of this invention generally leave the textile material essentially dry to the touch and thus require less energy consumption in drying and further treatment of the textile. The foams have a foam density of 0.005 to 0.3 gram per cc, and average bubble size of from 0.05 to 0.5 millimeters in diameter and a foam half-life of from one to sixty minutes.

5 Claims, 1 Drawing Figure

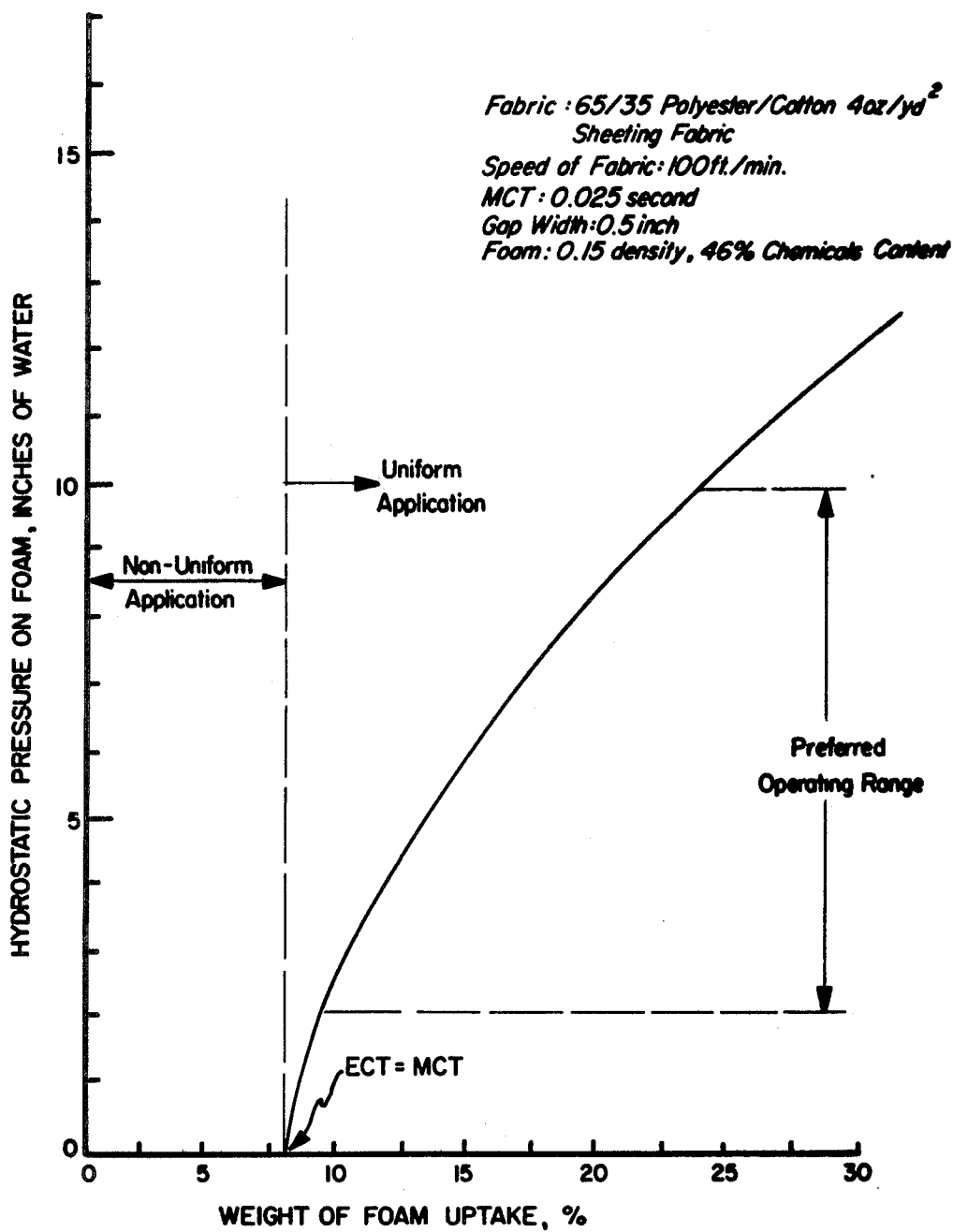

FOAMS FOR TREATING FABRICS

BACKGROUND OF THE INVENTION

The treatment of textile materials with various chemicals, dyestuffs, resins and the like has been long conducted by the use of aqueous baths. In such processes the fabric is essentially saturated by immersion in a water bath containing the treating chemical and eventually the water must be removed in order to continue the processing or to dry the fabric. Of the many procedures employed in the past for the treatment of fabrics, the most commonly employed is the pad-dry process in which the fabric is immersed and saturated with the aqueous treating solution, squeezed between rollers to a given wet pick-up and subsequently dried or dried and cured on a frame or heated drying roll before being taken up in a roll once again. The amount of water retained by the fabric is normally controlled by the pressure of the squeeze roll; in conventional methods a lower limit of about 50 to 70 percent water based on the weight of the fabric is still retained, depending upon the particular fabric used. This large amount of water requires a tremendous amount of energy in the form of heat to dry the fabric. It has been estimated that the amount of energy required to remove the water and dry the fabric is many times greater than the amount of energy that is needed in heating the cloth to carry out the desired chemical treating step, as for example, in the application and cure of a wash and wear finish on the fabric, or in the continuous dyeing of a fabric. In addition to the pad-dry process, in which the water is removed by squeezing between rollers, other procedures have recently been developed for more efficient removal of water. In one such procedure the saturated fabric is conveyed to a jet squeezer which employs a stream of compressed air jetting outward at the point of contact between the fabric and the nip rolls to substantially reduce the moisture content of the fabric. The use of this technique has resulted in a decrease of the water content in the fabric to about half of that normally remaining when using the squeeze roll technique discussed above. In another procedure vacuum extractor rolls are used. This process entails conveying the wet fabric as it exits from the treating bath over a perforated roll within which a vacuum is created whereby the moisture is extracted from the fabric. In some instances, roller coating methods can be used which continuously deliver aqueous treating composition to the fabric and the add-on is governed by the fabric speed and the rate of delivery of the treating composition by the coating roller. In this procedure the treating composition generally remains predominantly on or near the surface of the fabric, particularly when low add-ons are involved.

Within the past few years, several new approaches have been made to obtain uniform application of compositions to porous substrates. These recently developed procedures use foams in different form. However, the methods by which the foams had been applied to treat the fabric or yarn leave much to be desired. One such disclosure is to be found in U.S. Pat. No. 3,697,314 issued Oct. 10, 1972. In this patent there is shown a method for producing foam and then passing yarn through the foam so as to coat the exterior surface of the yarn with the foamed treating agent. It stresses that the yarn must pass through the foam agglomerate in order to assure a uniform distribution of the agent over the entire circumferential surface of the yarn as it passes through the foam. The reference shows no means by which the foam could be applied on only one surface of a fabric or material and still obtain uniform distribution or uniform penetration of the interior of the yarn or fabric. An earlier attempt to use foam for the treatment of textile materials is to be found in U.S. Pat. No. 1,948,568, issued Feb. 27, 1934. In this disclosure, a textile material is suspended in a closed container and foam is pumped into the container and forced through the textile material until the textile material is uniformally impregnated from all sides throughout the substrate structure and saturated with the textile treating agent in the form of a foam. In the batch process disclosed in this patent, the textile material is in a stationary or fixed position.

Though disclosures do exist on the use of foam for the treatment of textile materials, essentially all of the industry still uses aqueous treating baths and processes in which the fabrics are generally immersed in the bath for the application of the treating material to the textile. As previously indicated, this entails the use of a large amount of energy to subsequently remove the water from the fabric. Further, none of the literature discloses foam compositions that have the adequate stability and penetration properties needed for treating a fabric without deposition of large quantities of water to it.

SUMMARY OF THE INVENTION

This invention relates to foam compositions useful for treating a porous substrate such as a fabric or textile material or a paper product by the application thereto of the foamed textile treating composition. The invention comprises a foam having a specified foam density and bubble size and a specified froth stability half-life. The foams of this invention are applied by continuously conveying the foam textile treating composition to an applicator nozzle and continuously passing a substantially dry textile material to be treated across the applicator nozzle so as to simultaneously contact the dry textile material with the foam textile treating composition of this invention and the applicator nozzle. In this manner, a predetermined and controlled amount of the foam textile treating composition is absorbed by the textile material at the applicator nozzle; the amount being an amount that generally leaves the surface of the textile material essentially dry to the touch. Subsequently the textile material is recovered and further treated if necessary.

DESCRIPTION OF THE INVENTION

The foams of this invention can be used to treat any porous substrate such as a textile fabric or a non-woven material, paper, or wood veneer, with any of the functional chemicals that are normally used in their treatment. Thus, the foam compositions can be used to apply a flame retarding composition, a waterproofing or water repellant composition, a latex, a fabric softener, a lubricant, a hand builder, a dye or pigment for coloring the fabric, a sizing agent, a whitening agent or fluorescent brightener, a bleach, a binder for a non-woven fabric, a scouring agent, a radiation curable or polymerizable monomer or polymer or oligomer, or any other material that is normally used or applied to a fabric or similar substrate. As previously indicated, use of the foam compositions of this invention permits one to apply the functional or treating chemical in the form of a foam or froth to the surface of the material without employing unnecessarily large quantities of water. In view of the escalating energy costs and short supplies of natural gas and other fuels this is a distinct advantage since less energy is required in the further and subsequent treatment of the treated substrate.

In this invention a formulation or composition containing a functional textile treating reagent that is to be added to the fabric is converted to a foam having certain physical properties. The term functional textile treating composition or variants thereof is used in this application to define a formulated composition containing a reactive or functional reagent that is used to treat a porous substrate such as a fabric or paper to impart a desired physical or chemical property thereto. These functional treating compositions are used to produce the foams of this invention and contain the foaming agent, functional chemical, wetting agent, water and other additives, as identified and in the concentrations hereinafter set forth. The equipment that can be used for producing the foams of this invention is well known and many different types are commercially available. After the formulation has been foamed, the foam is conveyed to a foam applicator nozzle where it is transferred to the surface of the textile material that is to be treated. The manner in which the foam is transferred to the textile material is critical for uniform distribution on to the fabric. It has been found that the specific density, bubble size, and the stability of the foam are important. When the entire process is properly carried out, one obtains a fabric which has been treated uniformly and which is generally essentially dry to the touch. Use of the foams of this invention exhibit many advantages over the conventional prior methods in which the fabric is completely immersed in an aqueous treating solution. For example, by the use of our defined process the low water pick-up results in lower energy consumption in drying, reduced water consumption and water pollution, absence of migration of the functional chemicals deposited on the fabric during the drying operation, the ability to treat one side of the fabric without affecting the other side of the fabric if desired, more efficient utilization of the functional chemicals, sequential addition of various functional chemicals without an intermediate drying step, higher processing speeds as well as many other advantages which will become apparent hereinafter.

The foams of this invention permit the treatment of a substrate with the deposition on the substrate of appreciably lesser quantities of water than has heretofore been the practice. Even with the lower quantities of water applied one can still obtain uniform distribution and penetration of reactants into the substrate. This was a completely unexpected and unobvious finding since it has heretofore been the belief that a substrate, such as a fabric or textile, had to be completely saturated with the aqueous treating bath to achieve uniform and even distribution and penetration. That this could be accomplished by application of a foam or froth to the surface of the fabric and that it could be performed at such high rates of speed as we have found were completely surprising and unexpected.

The foam is usually generated in commercially available foam generating devices, which generally consist of a mechanical agitator capable of mixing metered quantities of a gas, such as air, and a liquid chemical composition containing the functional treating agent or chemical that is to be applied to the fabric and converting the mixture to a foam. It has been found that the density of the foam, its average bubble size and the stability or foam half-life of the foam are important factors. The density of the foam can range from 0.005 to 0.3 gram per cc, preferably from 0.01 to 0.2 gram per cc.

The foams generally have an average bubble size of from about 0.05 to 0.5 millimeters in diameter and preferably from 0.08 to 0.45 millimeters in diameter. The foam half-life is from 1 to 60 minutes, preferably from three to forth minutes.

The foam density and foam half-life are determined by placing a specified volume of the foam in a laboratory graduated cylinder of known weight, a 100 cc or 1,000 cc cylinder can be used, determining the weight of the foam in the cylinder, and calculating the density from the known volume and weight of the foam in the cylinder.

From the measured foam density and volume, and the known density of the precursor liquor, the liquor volume which would equal one-half of the total weight of the foam in the cylinder is calculated. The foam half-life is the time for this volume to collect in the bottom of the cylinder.

The foam bubble size is measured on a sample of foam taken at the applicator nozzle and is determined by coating the underside of a microscope glass slide with the foam, placing the slide on the microscope, supporting the slide on each side by two slides, and photographing it at once, preferably within 10 seconds, with a Polaroid ® camera at a magnification of 32 fold. In an area of the photomicrograph measuring 73 by 95 mm, corresponding to an actual slide area of 6.77 square millimeters, the number of bubbles is counted. The average bubble diameter size in mm. is then determined by the equation:

$$\text{Average Bubble Size} = \frac{2}{\sqrt{\pi}} \left[ \frac{(6.77)(\text{Liquid Density} - \text{Foam Density})}{\text{No. of Bubbles}} \right]^{\frac{1}{2}}$$

The formulated compositions used for producing the foam of this invention contain a frothing or foaming agent at a concentration of about 0.2 to 5 weight percent, preferably from 0.4 to 2 weight percent; the functional chemical at a concentration of from about 5 to 75 weight percent, preferably from 10 to 60 weight percent, this being dependent upon the particular functional chemical being employed; with water making up the balance of the weight of the total composition. There can also be present, as an optional ingredient, a wetting agent at a concentration of from about 0.001 to 5 weight percent or more, preferably from about 0.01 to 1.0 weight percent of the total composition when the wetting agent is used. However, it need not always be present and can in some instances be completely absent when the foaming agent supplies sufficient wetting action.

As a frothing agent, one can use any surface active agent which will produce a foam having the characteristics hereinbefore described. The formulated composition is foamed in a conventional foaming apparatus to produce the novel foams of this invention using air or any inert gaseous material. The amount of gas that is used to foam the composition is generally about 5 times the volume of the liquid formulated composition that is to be foamed and can be as much as 200 times or more thereof. In this manner there is produced the foam having the desired density and bubble size. The particular components used to produce the foam are important in order to achieve a foam which will be readily absorbed in a uniform manner by the substrate material and permit the application of the desired amount of the functional chemical to the substrate.

Illustrative of suitable foaming or frothing agents, one can mention the ethylene oxide adducts of the mixed $C_{11}$ to $C_{15}$ linear secondary alcohols which contain from about 10 to 50 ethyleneoxy units, preferably from about 12 to 20 ethyleneoxy units in the molecule. One can also use the ethylene oxide adducts of the linear primary alcohols having from 10 to 16 carbon atoms in the alcohol moiety, or of the alkyl phenols wherein the alkyl group has from 8 to 12 carbon atoms, wherein the adducts can have from about 10 to about 50, preferably from about 12 to 20 ethyleneoxy units in the molecule. Also useful are the fatty acid alkanolamides such as coconut fatty acid monoethanolamide. Another suitable class of frothing agents is the group of sulfosuccinate ester salts, such as disodium N-octadecylsulfosuccinate, tetrasodium N-(1,2-dicarboxyethyl)-N-octadecylsulfosuccinate, diamyl ester of sodium sulfosuccinic acid, dihexyl ester of sodium sulfosuccinic acid, dioctyl ester of sodium sulfosuccinic acid, and the like. In addition to the above nonionic and anionic surfactants one can also use a cationic surfactant or an amphoteric surfactant such as distearyl pyridinium chloride, N-coco-beta-aminopropionic acid (the N-tallow or N-lauryl derivatives) or the sodium salts thereof, stearyl dimethyl benzyl ammonium chloride, the betaines or tertiary alkylamines quarternized with benzene sulfonic acid. These are well known and any similar surfactant can be used in addition to those specifically identified above. Blends of one or more surfactants are often used to advantage. In selecting the foaming agent for a particular formulation, care must be exercised to use those which will not unduly react with the other reactants present or interfere with the foaming or treating process.

As previously indicated a wetting agent also can be optionally present when its presence is needed to produce a foam of the desired fast breaking and wetting properties with sufficient stability to be pumped from the foam generator to the applicator nozzle. The foams of this invention are semi-stable and fast wetting and they are produced from formulated compositions containing the defined components in relatively high concentrations when compared to the conventional aqueous treating compositions heretofore used. The foams produced must have sufficient stability to allow pumping of the foam from the foam generator to the applicator head, but the foam must be readily broken and rapidly absorbed when it reaches the substrate surface. The foam breakdown characteristic is important, since retention of the foam or bubble structure on the treated substrate surface can result in craters, spotting, or otherwise uneven distribution on the substrate. In addition, foam breakdown characteristics are important to facilitate recycle; any of the known physical techniques, i.e., elevated temperature, mechanical shear, etc., can be used in the recycle step. In regard to foam breakdown, the foam compositions having the foam half-life defined have been found to possess the desired combination of stability to facilitate pumping and delivery to the substrate and instability to facilitate fast wetting when contacted with the substrate and ease of recycle.

The presence of the optional wetting agent is important when the foaming agent used produces a stable foam but the foaming agent is a relatively poor wetting agent with the consequence that the foam does not provide sufficient front to back uniformity or penetrability for continuous high speed application to the substrate. In such instances a combination of foaming agent and wetting agent is used. Illustrative of suitable wetting agents one can mention the adduct of 6 moles of ethylene oxide with trimethyl nonanol, the adducts of about 7 or 9 moles of ethylene oxide with the mixed $C_{11}$ to $C_{15}$ linear secondary alcohols or with the $C_{10}$ to $C_{16}$ primary alcohols, the adduct of 9 moles of ethylene oxide with nonylphenol; the silicone wetting agents of the structure

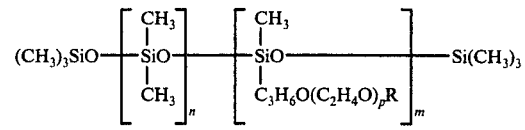

wherein $n$ has a value of 5 to 25, $m$ has a value of 3 to 10, $p$ has a value of 6 to 20 and R is alkyl of 1 to 6 carbon atoms; also useful are the commercially available fluorocarbon wetting agents such as the known perfluoroalkylated surfactants.

The amount of such wetting agent to be added to provide for the fast breaking and rapid absorption properties of our foams will vary depending upon the particular wetting agent selected, however, this amount can be readily ascertained by a preliminary small scale evaluation. Thus, it was observed that the concentration of the fluorocarbon wetting agents is preferably in the range of from 0.001 to 0.5 weight percent, and the range for the silicone wetting agents is preferably from 0.01 to 0.3 weight percent. It has also been observed that excessive quantities of the silicone or fluorocarbon wetting agents may inhibit foam formation or shorten stability of the foam to such an extent that pumping and delivery of foam to the substrate is no longer feasible. Thus, the preliminary small scale screening test will establish if such a problem exists in any particular instance. As previously indicated, some foaming agents possess sufficient wetting properties that there is no need for the use of the supplementary or optional wetting agents. However, in most instances, better front to back uniformity of treatment of the substrate is obtained using a mixture or combination of foaming agent and wetting agent. It has also been observed that the addition of a known foam stabilizer, such as hydroxyethyl cellulose or hydrolyzed guar gum, can be of benefit, provided it does not unduly affect the desired foam properties and application of the foam to the substrate.

The stability of the foam before it comes into contact with the substrate is an important characteristic of the foam. The foam is thus readily conveyed from the foam generating means to the applicator head and does not break until it contacts the substrate (e.g., textile) that is to be treated. Upon contact the foam immediately breaks and the components thereof are absorbed into the substrate structure in a uniform, even distribution and penetration. As indicated in this specification this is achieved by the proper selection of components, foam producing procedure employed and application of the foam to the substrate; in some instances a simple preliminary laboratory evaluation may be necessary to assure proper conditions.

The foam compositions of this invention, to our knowledge, include the first successful reported use of a durable press or wash-wear composition in a foam or froth state to a textile or fabric.

The foams of this invention permit the application of any number of functional treating chemicals to a substrate to impart a particular property or treatment thereto. Thus, the foam compositions can contain and thus be used to apply flame-retarding reagents, waterproofing or water-repellant reagents, mildew proofing reagents, bacteriostats, antistats permanent press or wash and wear compositions, softeners, lubricants, hand builders, dyes, pigments, sizes, whitening agents, fluorescent brighteners, bleaches, binders for non-woven fabrics, latexes, scouring agents, thermal or radiation curable monomers or oligomers or polymers, soil or stain release agents, or any other material known to be used in the treatment of textiles or papers. An important requirement of the selected functional or treating chemical is that it not interfere with the foam generation, nor with the foam properties to the extent that the foam composition could not be properly conveyed to the applicator nozzle or that the foam could not be properly applied to the substrate in a manner and form that it would rapidly break and penetrate the substrate in a uniform manner. The process is not limited to any particular functional or treating agent or combination of agents. Illustrative of typical functional chemicals one can mention dimethyloldihydroxyethylene urea, dimethylolethylene urea, dimethylolpropylene urea, urea formaldehyde resins, dimethylol urons, the methylolated melamines, methylolated triazones; the methylolated carbamates such as the ethyl or methoxyethyl or isopropyl or butyl carbamates; the epoxides such as vinyl cyclohexene dioxide, 2,3-diallyoxy-1,4-dioxane, 2,3-bis(2,3-epoxypropoxy)-1,4-dioxane, the diglycidyl ether of bisphenol-A, bis(3,4-epoxybutyl)ether; flameproofing agents such as tetrakis hydroxymethyl phosphonium chloride, polyvinyl chloride latexes, (N-hydroxymethyl-3-dimethyl phospono)propionamide; water-proofing or water repellant agents such as aluminum formate, sodium formoacetate, methylene bis-stearamide; mildew proofing and bacteriostat agents such as copper-8-quinolinolate, dihydroxydichlorodiphenylmethane, zinc salts of dimethyldithiocarbamic acid, dihydroxymethyl undecylenamide; latexes such as polyvinyl acetate latexes, acrylic latexes, styrene-butadiene latexes; softeners such as emulsifiable polyethylene, dimethyl stearate ammonium salts; lubricants such as butyl stearate, diethylene glycol stearate, polyethylene glycol, polypropylene glycol; hand builders such as polyvinyl acetate latexes, acrylic latexes, styrene-butadiene latexes; dyes and pigments such as Acid Blue 25 (Color Index 62055), Acid Red 151 (Color Index 26900), Direct Red 39 (Color Index 23630), Dispersed Red 4 (Color Index 60755), Phthalocyanine Blue 15 (Color Index 74160); sizes such as polyvinyl alcohol, corn starch; whitening agents such as 4-methyl-7-diethylaminocoumarine; bleaches such as sodium hypochlorite, chlorine, hydrogen peroxide, dichlorodimethyl hydantoin, sodium perborate; binders for non-woven fabrics such as ethylene-vinyl acetate emulsion polymer, acrylic emulsion polymer, vinyl-acrylic copolymer; scouring agents such as sodium lauryl sulfate, triethanolamine lauryl sulfate, sodium N-methyl-N-oleoyltaurate, primary and secondary alcohol ethoxylates; radiation curable monomers and oligomers such as 2-hydroxyethyl acrylate, neopentyl glycol diacrylate, pentaerythritol triacrylate, isodecyl acrylate, acrylated epoxidized soybean or linseed oil; antistatic agents such as ethoxylated stearyl amines; soil or stain release agents such as acrylic polymers and fluorocarbon emulsions.

The foam compositions of this invention are prepared by mixing the selected functional textile treating chemical, foaming agent, wetting agent and water, with other conventional agents normally present, in the amounts indicated. This formulation has a Brookfield viscosity of from 0.5 to 75 cps, preferably from 1 to 50 cps at 25° C. The manner of preparing the formulation used to produce the foam will depend upon the particular functional or treating agent present and the procedures normally used for preparing compositions containing the selected functional agent are normally employed in producing our formulations. The formulation is then foamed, the foam is conveyed to a foam applicator head or nozzle and there it is applied to the surface of the substrate.

In producing our foam compositions, a metered quantity of the formulation is introduced to the foamer and foamed. The foaming step is controlled by adjusting the volume of air introduced to the foamer and the rotation rate, in rpm, of the rotor in the foamer. The rotor's rotation rate plays an important role in producing a foam that will have the previously defined bubble size and half-life. The relative rates of the feed of the formulation and the gas will determine the density of the foam. These facts are known to those skilled in the art.

The nozzle used to apply the foam of this invention to the substrate and the manner in which the substrate contacts the nozzle play important roles in the successful application of the foams of this invention to the substrate. The applicator nozzle is designed that it has sufficient side-to-side width that foam can be applied across the width of the fabric. The gap or width between the forward and back lips of the nozzle orifice will vary from 10 mils to about 6 inches or more, preferably from 20 mils to 4 inches. The width or gap of the nozzle orifice is of a dimension such that the machine contact time is equal to or less than the equilibrium contact time for the particular foam-substrate combination that is being run, as defined by the equation $MCT \leq ECT$.

The machine contact time, abbreviated MCT, is the amount of time that any given point of the substrate remains over the nozzle orifice during the application of foam to the substrate. The machine contact time in seconds is equal to the gap or orifice width in inches divided by the speed of the fabric in inches per second. The equilibrium contact time, abbreviated ECT, is the time required for the substrate to absorb the foam at the rate the foam is being delivered to the applicator nozzle. Additional foam will be absorbed by the substrate when the foam is under pressure. Preferably, a slight uniform pressure of 2 to 20 inches of water is maintained on the foam to control uniformity of its application. It has been observed that when MCT is greater than ECT that non-uniform application results. In other words, when absorption rate is greater than the delivery rate of the foam, uniform application is no longer achieved. However, in some instances it may be desired to have MCT greater than ECT when applying the foam to a substrate. It has been observed that in such instances one may obtain an uneven stripe or random pattern across the width of the substrate. This is of interest, for example, when even dyeing is not desired and a barre pattern is sought.

The nozzle orifice used to apply our foams to a substrate preferably consists of two lips, edges or surfaces that are spaced apart and are of sufficient length to essentially equal the width of the substrate. The substrate contacts the edges of the two lips, which may be of any selected configuration, e.g. pointed, tapered, flat, beveled, arced, or otherwise, with a pressure sufficient to provide a seal and confine the foam to the zone between the lips. The angular relationship between the substrate as it makes initial contact with a lip and as its exits from a lip, with the application zone, and with the lip surfaces are varied over a wide range, to assure a seal between the substrate and lips. The side extremities of the orifice must be sealed so that the foam does not escape. In some instances when MCT=ECT, it has been possible to operate with only the exiting or downstream lip in contact with the substrate.

A figurative description of an embodiment of the invention is shown in FIG. 1, which illustrates the typical relationship that exists between foam uptake by the substrate and hydrostatic pressure on the foam. The curve describes the uptake of foam, measured as total composition including water, by a nominal 4 oz./yd.$^2$, 65/35 polyester/cotton sheeting fabric at a machine contact time (MCT) of 0.025 second. It is surprising and unexpected to find such a large volume of foam being taken up by the fabric at atmospheric pressure within the very short contact time of 0.025 second. The figure shows that foam equivalent to 8 percent of the weight of the substrate, or approximately 35 percent of the unoccupied volume of the fabric, is taken up by the substrate at atmospheric pressure within this short machine contact time. It is also apparent from the slope of the curve that the uptake of foam by the substrate can be increased substantially at low hydrostatic pressures, or, alternatively, at longer equilibrium contact time. It has been found that the uptake is relatively independent of fabric speed so long as the nozzle orifice width is adjusted to maintain the same machine contact time. On the other hand, the uptake is affected by fabric and foam characteristics as described elsewhere. At low levels of uptake (below 8 weight percent in FIG. 1) an unsteady condition is encountered which leads to nonuniform application of treating chemicals; i.e., the MCT is greater than ECT. A steady state condition can be achieved when *MCT=ECT* as illustrated by the intercept of the curve and the abscissa in the figure. Control over uniformity of up-take is achieved with a positive hydrostatic pressure. Therefore, the machine contact time is adjusted to be equal to, or preferably less than, the equilibrium contact time of the fabric-foam system. Preferred operating conditions are achieved when the machine contact time causes a hydrostatic pressure on the foam in the nozzle ranging between 2 in. and 10 in. of water pressure.

The foams of this invention can be used to apply a single functional treatment, or a multiplicity of functional treatments, using a plurality of foaming and application systems, to a substrate followed by subsequent drying or drying and curing of the substrate treated with our foams prior to take-up. Further, since the amount of foam formulation added on to the substrate is generally below the water retention capacity of the substrate, the substrate can be rolled up without drying and stored or transferred to another location for subsequent use or treatment. The substrate to which the foam is applied may be, but need not be, dry. The ability to apply a desired quantity of a foam formulation independent of the initial state of dryness of the substrate, provided the substrate is not completely saturated, is a unique, unexpected, unobvious, and desirable feature of this process.

The multiple application of two or more foam compositions in succession, using separate functional chemical formulations and applicator nozzles for each, with or without intermediate drying, curing or take-up steps is possible with our claimed foams. This multiple application procedure is of particular advantage when the separate treatments or the functional reactants present in the foams are not compatible with each other or are too reactive with one another to be present in a single formulation or foam.

The substrate to which the foam composition has been applied can be subsequently thermally or radiation treated dependent upon the particular foam formulation applied and the objective sought. Thus, the treated substrate can be thermally treated to dry or to cure the applied foam composition or it can be exposed to nonionizing or ionizing radiation. In any instance any of the known thermal or radiation treatments pertinent to the particular formulation and substrate can be employed. Thus, for drying or thermal cure one can use infrared lamps, hot gases, ovens, heated rollers, or similar conventional heating means. For radiation curing one can use ultra-violet radiation, gamma radiation, electron beam radiation, or similar conventional means, whether inerted or not.

The rate of foam formulation uptake by the substrate is influenced by the foam properties, the weight and construction of the substrate, the initial degree of dryness of the substrate and the degree of hydrophilicity of the substrate. Thus, the natural fibers such as wool, cotton or linen are known to be more hydrophilic than are some of the synthetic fibers such as polyester. Hence, these natural fibers can absorb more of the foam composition and still maintain an essentially dry-to-the-touch feel. It has also been observed that selective pre-wetting or post-wetting of localized areas of the substrate results in migration of the treating foam formulation outward towards the edges of the pre-wetted or post-wetted regions, while the non-wetted regions will dry uniformly without migration. With a dye-containing foam, this technique produces washed-out patterns similar to the effects achieved by tie-dyeing procedures without the need to tie the fabrics.

A particularly unexpected and unobvious finding was that the foam was absorbed by the substrate at a rapid rate and in large volume. In most instances the desired amount of foam formulation was applied and absorbed within a period of a fraction of a second, generally within less than 0.05 second. Equally unexpected was the discovery that the foam could be applied evenly across the entire substrate or in selected patterns.

In a typical embodiment for applying the foam to a substrate the equipment used would consist of equipment means to convey the fabric from a let-off roll to the applicator nozzle, a reservoir to prepare and store the textile treating composition, foam generating means for foaming said composition and producing the foams of this invention, foam recycle means, means to convey the foam to the applicator nozzle, a foam applicator head and nozzle, and take-up means. Optionally one can include treating means to treat or cure the foam treated textile, such as an oven or a radiation generating source. For the purposes of this application the foam applicator nozzle was produced using plexiglass sheet so that visual observation could be maintained. However, any other suitable construction material could be used.

In a typical operation the fabric would be conveyed from a let-off roll across various guide rolls and nip rolls and the foam treating composition of this invention would be applied to one of the surfaces of the fabric as the fabric made contact with the nozzle of the foam applicator head. The fabric was then collected at a take-up roll. As the fabric was conveyed across the foam applicator nozzle, the foamed functional treating composition would come into contact with it and be absorbed by the fabric. The foam entered the chamber via a foam inlet point in the base and exited from the foam applicator head via the applicator nozzle slit whereat it was deposited on the fabric. The foams of this invention are produced by foaming a metered quantity of the textile treating composition in a commercially available foamer and conveying the formed foam to the chamber of the applicator head by suitable conveying means. As the foam entered the chamber via the foam inlet point and filled it the velocity of the foam diminished before it entered the slit or orifice of the applicator nozzle. It was observed that uniform coating of the foam onto the fabric substrate was achieved when both lips of the applicator nozzle were preferably in contact with the fabric. If the first or upstream lip did not touch the fabric, foam would tend to build up behind the applicator nozzle lip producing a bank of foam and non-uniform application and penetration would often result. When the second or downstream lip of the applicator nozzle did not touch the fabric the curtain of foam would be pulled away from the nozzle slit and areas of the fabric would be skipped, also leading to non-uniform application of the foam composition. In view of these observations it was determined that uniform application of the foam to the fabrics to substrate could best be accomplished when both lips of the applicator nozzle were preferably in contact with the fabric substrate. However, in some instances it was possible to achieve good application with the fabric in contact solely with the downstream lip, particularly when $ECT = MCT$.

The following equations are useful in determining the amounts of formulated composition metered into the foamer and the amount of foam to be applied to the substrate. Equation I indicates the volume of liquid formulated composition metered in cubic feet per minute:

$$V_l = \frac{(C_s)(v_s)(w_s)(\lambda)}{c_1 \rho_1}$$

Equation II indicates the volume of foam applied to the substrate in cubic feet per minute:

$$V_f = \frac{(C_s)(v_s)(w_s)(\lambda)}{(c_1)(\lambda f)}$$

The symbols have the following meanings:
$v_s$ = substrate linear velocity (line speed), ft/min
$V_l$ = liquor volume flow rate, ft$^3$/min
$V_f$ = foam volume flow rate, ft$^3$/min
$\rho_f$ = density of foam, lb/ft$^3$
$c_1$ = concentration (solids) of liquor, % ows
$w_s$ = fabric substrate weight, lb/ft$^2$
$c_s$ = solids add-on to fabric, % owf
$\lambda$ = width across treated substrate or nozzle orifice, ft $\rho_1$ = density of liquid, lb/ft$^3$
The test procedures used were:

| | |
|---|---|
| Durable press rating | AATCC 124-1967T; Washing Procedure III (140° F); Drying Procedure A & B (Tumble and Line Dry) |
| Dry Wrinkle recovery | AATCC 66-1959T |
| Tear strength (Elmendorf) | ASTM D-1424-59 |
| Tensile strength Grab) | ASTM D-1862 |
| Wash-wear | AATCC 124-1967T Washing Procedure III; Drying Procedure A and B |
| Yellowness Index | Using a Hunterlab Model D-40 Reflectometer |
| Yellowness = | $\frac{\text{Green reflectance-Blue reflectance}}{100}$ |

The following definitions apply to various components used in the examples:

DMDHEU — 1,3-dimethylol-4,5-dihydroxy-2-imidazolidone, 45% aqueous solution.
Softener I — a 30 weight percent aqeuous emulsion of low density, low molecular weight modified polyethylene.
Softener II — a 30 weight percent emulsion of low density, low molecular weight polyethylene.
Handbuilder I — an ethylacrylate/N-methylolacrylamide/acrylic acid latex, 48% total solids.
Frothing Agent I — adduct of mixed $C_{11}$ to $C_{15}$ linear secondary alcohols with 20 moles of ethylene oxide.
Frothing Agent II — dioctyl ester of sodium sulfosuccinate.
Frothing Agent III — adduct of mixed $C_{11}$-$C_{15}$ linear secondary alcohols with 12 moles of ethylene oxide.
Wetting Agent I — adduct of mixed $C_{11}$ to $C_{15}$ linear secondary alcohols with 9 moles of ethylene oxide.
Wetting Agent II — siloxane of the average structure:

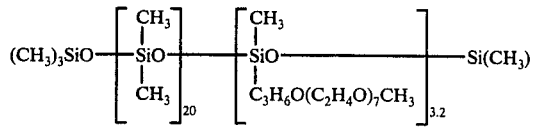

Wetting Agent III — siloxane of the average structure:

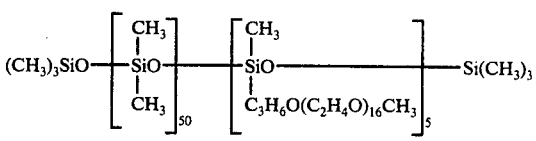

Wetting Agent IV — adduct of mixed $C_{11}$-$C_{15}$ linear secondary alcohols with 12 moles of ethylene oxide.
The following examples serve to further illustrate the invention.

EXAMPLE 1

Two formulations were prepared by mixing the following components at the indicated weight percentage amounts:

| Formulation | A | B |
|---|---|---|
| DMDHEU | 22.2 | 73.9 |
| Zinc nitrate, 30% sol. | 4.4 | 14.7 |

-continued

| Formulation | A | B |
|---|---|---|
| Softener I | 2.3 | 7.4 |
| Wetting Agent I | 0.1 | 0.4 |
| Frothing Agent I | 1.1 | 3.6 |
| Water | 69.9 | 0 |

The total solids contents of Formulations A and B, respectively, were 12.6 and 39.0 weight percent. Two hundred ml. portions of each were separately foamed in a Kitchen Aid ® Model 4C Mixer at the maximum speed of the mixer. The foam densities after various mixing times and the foam stabilities or half-life are set forth below;

| Formulation Foam density, g/cc | A | B |
|---|---|---|
| 1 minute stir | 0.057 | 0.067 |
| 3 minute stir | 0.059 | 0.060 |
| 5 minute stir | 0.061 | 0.068 |
| 10 minute stir | 0.056 | 0.046 |
| Foam Half-Life, min | >15 | >45 |

The data establishes that durable press resin formulations having total solids contents ranging from 12.6 to 39 weight percent can be used to produce foams having the desired foam densities and foam half-life in the laboratory. The foams produced were applied with a doctor blade to one surface of a 50/50 polyester/cotton sheeting that weighed about 4.5 ounces per square yard. A solids chemicals add-on of about 5 weight percent, owf, was obtained with Formulation A at a foam thickness of 62 mils and about 7.9 weight percent at a foam thickness of 24 mils. Formulation B was applied at an average solids add-on of about 22 weight percent at a foam thickness of 24 mils.

The treated fabrics were cured by heating for 1.5 minutes at 300° F. in an air oven. The fabric treated with Formulation A was flexible whereas the fabric treated with the high-solids content Formulation B was stiff and yellow in color. The experiment illustrates that one can supply either a low-solids or high-solids compositions but that too high a solids add-on is not advisable.

EXAMPLE 2

The desirability of having a preferred frothing agent in the fabric treating formulation used to produce the foam was established in the series of formulations set forth below. As shown below, Formulation A produced a foam having a foam density of 0.06 g/cc; this formulation contained Frothing Agent A. While Formulation B produced a useable foam due to the presence of Wetting Agent I, which is chemically related to Frothing Agent I, having a foam density of 0.11 g/cc, the stability of this foam was not as good. Formulation C would not produce a foam and Formulations D, E and F produced foams that still contained some liguid, unfoamed formulation in the mixture. The comparisons were made by foaming the formulations in a Kitchen Aid ® Model 4C Mixer for five minutes at maximum speed and in an Ease-E-Foamer ® Model No. E1000 in which the rotors were rotating at a rate of 410 rpm. Similar results were obtained in both instances. In the following table the concentrations are indicated in weight percent.

| Formulation | A | B | C | D | E | F |
|---|---|---|---|---|---|---|
| DMDHEU | 73.8 | 74.9 | 100 | 91.8 | 75.4 | 75.4 |
| Zinc nitrate, 30% | 16.4 | 16.4 | — | — | 16.4 | 16.4 |
| Softener I | 8.2 | 8.2 | — | 8.2 | 8.2 | 8.2 |
| Frothing Agent I | 2.2 | — | — | — | — | — |
| Wetting Agent I | 0.4 | 0.4 | — | — | — | — |
| Wetting Agent II | 0.1 | 0.1 | — | — | — | — |
| Foam density, g/cc | 0.06 | 0.11 | — | 0.43 | 0.39 | 0.39 |
| Comment | Froth ⟶ Liq. S. Liq. ⟶ | | | | | |

EXAMPLE 3

In this example the performance properties of several wash-wear formulations applied as froth compositions and by the conventional pad bath process are compared using DMDHEU from four different sources.

Section I

Formulations for Producing the Froth and their Application and Cure

Four batches of DMDHEU from different sources were used to produce four formulations, each of which contained the following components in weight percentages; these are identified as Formulations A. B, C and D in this example:

| | |
|---|---|
| DMDHEU | 73.8 |
| Zinc nitrate, 30% | 16.4 |
| Softener I | 8.2 |
| Frothing Agent I | 1.1 |
| Wetting Agent I | 0.5 |

Each of the four formulations was foamed as described in Example 1. The foams or froths had initial densities of 0.083, 0.083, 0.090, and 0.086 g/cc, respectively, and foam half-lifes of 30, 25, 30 and 35 minutes, respectively. The froths were applied to cotton fabric using a roll-down technique in which a puddle of foam was rolled across the fabric using a 2 inches diameter glass rod to deposit the foam evenly across the surface of the fabric. The treated fabrics were essentially dry to the touch. They were heated at 300° F. for 1.5 minutes and then at 340° F. for 1.5 minutes to completely cure the wash-wear formulation on the fabric.

Section II

Pad Bath Formulation and their Application and Cure

Pad baths were produced using the same four samples of DMDHEU. The baths contained the following components in weight percentages; they are identified as Formulations E, F, G and H in this example:

| | |
|---|---|
| DMDHEU | 18 |
| Zinc nitrate, 30% | 4 |
| Softener I | 2 |
| Wetting Agent I | 0.1 |
| Water | 75.9 |

Each of the four formulations was applied to te same cloth by conventional padding means. The padded fabrics were wet to the touch. They were heated and dried in the same manner set forth in Section I, above.

It is to be noted that Formulations A to D had a total solids content of 41.3 weight percent and a water content of 58.7 weight percent, whereas, Formulations E to H had a total solids content of 9.8 weight percent and a water content of 90.2 weight percent. The wet pick-up and solids add-on, both based on the weight of the fabric, and the properties of the treated fabric samples are set forth below. Also included are the properties of the untreated cotton fabric used. The results indicate that fabric samples treated with the froths of Formulations A to D can be cured without previously drying the fabric and that the wet pick-up is only about one-fourth that of fabric samples treated with Formulations E to H. The elimination of this large quantity of water on a commercial scale means that the drying step can be omitted with a concommitant saving in fuel, energy costs and time.

| Formulation | CONTROL | A | B | C | D | E | F | G | H |
|---|---|---|---|---|---|---|---|---|---|
| Wet pick-up, % | — | 20.2 | 20.6 | 20.4 | 19.6 | 78.0 | 76.0 | 76.5 | 75.0 |
| Add-on, % | — | 5.6 | 5.7 | 6.2 | 5.6 | 4.3 | 4.5 | 4.7 | 4.6 |
| Dry wrinkle recovery, Deg. | 116 | 292 | 288 | 285 | 292 | 271 | 268 | 265 | 300 |
| Durable press rating | | | | | | | | | |
| Spin dry | 1.0 | 3.0 | 2.6 | 2.8 | 3.1 | 2.5 | 2.8 | 2.0 | 3.1 |
| Tumble dry | 1.0 | 3.2 | 3.2 | 3.3 | 3.4 | 3.2 | 3.4 | 3.3 | 3.6 |
| Tear strength, g. | 1344 | 1168 | 944 | 1168 | 816 | 1312 | 1246 | 1456 | 912 |
| Tensile strength, lb. | 45 | 14 | 17 | 21 | 13 | 26 | 23 | 27 | 14 |
| Stiffness index, inch | 5.1 | 5 | 4.6 | 5 | 5.6 | 4 | 4.2 | 4.1 | 4.3 |
| Yellowness index | .048 | .042 | .044 | .043 | .064 | .045 | .048 | .052 | .077 |

EXAMPLE 4

A series of formulations was prepared to illustrate the suitability of wetting agents and a mixture of frothing agents in the formulations used for producing foams or froths. All of the formulations were readily frothed to foams that were applied to fabrics and cured to impart wash-wear characteristics to the fabrics. The formulations and foam densities are set forth below, with quantities recited in weight percent:

| Formulation | A | B | C |
|---|---|---|---|
| DMDHEU | 71.4 | 73.9 | 73.9 |
| Zinc nitrate, 30% | 14 | 16.4 | 16.4 |
| Softener I | | 8.2 | 8.2 |
| Softener II | 7.1 | | |
| Frothing Agent I | 7.1 | 1.1 | 1.1 |
| Frothing Agent II | | 0.4 | 0.4 |
| Wetting Agent I | 0.4 | 0.4 | |
| Foam density, g/cc | — | 0.058 | 0.059 |

EXAMPLE 5

The effect of hydroxyethyl cellulose as froth stabilizer was evaluated. It was observed that the foam half-life could readily be increased by the addition of small amounts thereof to the formulation. In this example 1.2 weight percent hydroxyethyl cellulose added to the formulation essentially doubled the half-life of the foam; it also served to increase the density thereof. In the table below, amounts are shown in percent concentrations of each component and the percent of hydroxyethyl cellulose added is based on the total weight of the other components previously mixed.

| Formulation | A | B |
|---|---|---|
| DMDHEU | 74.3 | 74.3 |
| Zinc nitrate, 30% | 16.5 | 16.5 |
| Softener I | 8.3 | 8.3 |
| Frothing Agent I | 1.1 | 1.1 |
| Wetting Agent II | 0.4 | 0.4 |
| Hydroxyethyl cellulose | 0 | 1.2 |
| Froth density, g/cc | | |
| 3 minutes stir | 0.078 | 0.105 |
| 5 minutes stir | 0.084 | 0.105 |
| 10 minutes stir | 0.083 | 0.118 |
| Foam Half-Life, minutes | 35 | 69 |

The formulations were frothed using the equipment described in Example 1. Shorter half-life periods are obtained by reducing the amount of hydroxyethyl cellulose used.

EXAMPLE 6 a formulation was prepared by mixing the following components at the weight percentage amounts indicated:

| | |
|---|---|
| DMDHEU | 81.2 |
| Zinc nitrate, 30% | 17.9 |
| Frothing Agent I | 0.3 |
| Wetting Agent IV | 0.6 |

The formulation also contained a trace amount of a red acid dye sufficient to tint the composition so that visual examination of uniformity of application could be determined.

The formulation was foamed in an Ease-E-Foamer ® Model No. E1000 foamer at a rotor speed of 410 rpms using a sufficient volume of air to produce a foam having a density of 0.078 g/cc. The liquid formulation was fed to the foamer at a rate of 564 cc per minute and the pressure on the foamer head was 16 psig. The foam was conveyed to an applicator nozzle and uniformly applied to one surface of a 50/50 polyester/cotton sheeting about nine inches wide that weighed about eight ounces per square yard. The fabric was travelling over the applicator nozzle at a speed of 300 feet per minute and the add-on of foam formulation to the fabric was 4.5 weight percent. The foam was evenly and uniformly applied to the fabric and as the foam composition contacted the fabric the bubbles burst, the composition was absorbed by the fabric and the fabric was immediately essentially dry to the touch. The treated fabric was then cured at 340° F. for 3 minutes; it had a dry wrinkle recovery of 292° and a tear strength of 2,997 grams, these properties on the untreated fabric were 215° and 3,541 grams, respectively.

The equipment used in producing and applying the foam were the identified foamer; suitable feed, take-up and guide roll means for the fabric; means for delivering the foam from the foamer to the foam applicator head; and the foam applicator nozzle. The foam applicator head consisted of a lower foam distribution chamber with a foam applicator chamber and nozzle mounted thereto above a foam distribution plate. The internal dimensions of the lower foam distribution chamber were a length of 9 inches, a width of 2 inches and a height of 2 inches. The base of this lower chamber had a 0.75 inch diameter foam inlet, centrally located. Mounted on the top of the foam distribution chamber was a foam distribution plate having a row of 15 holes each 3/16 of an inch in diameter. Mounted on the foam distribution plate was the foam applicator chamber which extended the full 9 inch length of the foam applicator head, had a height of 2 inches above the foam distribution plate and a nozzle orifice slit width of 1 3/16 inches between the two nozzle lips thereof. The space between the lips is the nozzle orifice. The upstream lip of the foam applicator nozzle was 0.5 inch wide and had a outward taper of 45°. The downstream lip of the foam applicator nozzle was 1.25 inches wide with the exterior 0.5 inch tapering outwardly at an angle of 45° and the interior 0.75 inch tapering inwardly towards the orifice at an angle of 5°. In operation the foam was produced in the foamer, entered the lower foam distribution chamber via the foam inlet in the base thereof, passed through the holes of the foam distribution plate into the foam application chamber and was applied to the fabric at the nozzle orifice between the lips of the applicator nozzle. The fabric was drawn across the orifice and lips of the applicator nozzle initially contacting the upstream lip and then contacting the downstream lip thereof at the indicated speed. As it moved across the nozzle orifice or slit opening and the applicator nozzle lips the foam was applied to the surface of the fabric at a slight positive pressure. It was uniformly absorbed by the cotton fibers as established by X-ray emission studies and scanning electron microscopic examination of the treated and cured fabric.

ness. It was found that the fabrics treated with the foam compositions of this invention were generally softer in hand than those treated by the pad bath process. The results are tabulated below:

| Formulation used | A | A | A | B | B | B | — |
|---|---|---|---|---|---|---|---|
| Fabric | a | e | c | d | e | f | g |
| Wet Pick-up, % | 21.9 | 22.2 | 16.3 | 70.5 | 74.0 | 75.0 | — |
| Add-on, % | 8.2 | 8.1 | 7.0 | 7.0 | 7.4 | 7.0 | — |
| Dry wrinkle recovery, ° | 303 | 308 | 301 | 311 | 302 | 303 | 261 |
| Tear strength, g. | 1712 | 1632 | 1760 | 1696 | 1776 | 1760 | 1648 |
| Yellowness index | .073 | .065 | .066 | .072 | .063 | .060 | .054 |
| Hand | 6 | 5 | 3 | 1 | 2 | 4 | 6 |

EXAMPLE 7

Formulations were prepared containing components for wash-wear properties and to impart softness or fullness of hand in the same formulation. For comparative purposes one formulation was prepared according to this invention (Formulation A) while the other formulation was prepared for conventional pad bath application (Formulation B). The concentrations are recited in weight percent values.

| Formulation | A | B |
|---|---|---|
| DMDHEU | 60.4 | 20.0 |
| Zinc nitrate, 30% | 15.1 | 5.0 |
| Softener I | 6.0 | 2.0 |
| Handbuilder I | 15.1 | 5.0 |
| Frothing Agent I | 3.0 | 0 |
| Wetting Agent I | 0.4 | 0.1 |
| Water | 0 | 67.9 |
| Total solids content, % | 43.7 | 13.5 |

Formulation A was foamed and applied to a 65/35 polyester/cotton fabric weighing 4.5 ounces per square yard by the foam application procedure described in Example 1. It was cured by initially heating for 90 seconds at 300° F. followed by heating for another 90 seconds at 340° F. The same fabric was treated with Formulation B by the conventional pad bath application process, dried and cured under the same conditions. In each instance three fabric specimens were treated with each formulation. These specimens were then evaluated against each other and compared to the untreated fabric. Softness or hand is a subjective test determined by a panel of experienced individuals; rating is on a scale of 1 to 6 with higher values representing improved soft-

EXAMPLE 8

A series of foam formulations was prepared containing softener as the sole functional textile treating compound; the concentrations of the components are recited in weight percent:

| Formulation | A | B | C | D |
|---|---|---|---|---|
| Softener I | 99 | 87 | 26.8 | — |
| Softener III | — | — | — | 39.5 |
| Frothing Agent I | 1 | 3 | 1.0 | 1.0 |
| Wetting Agent II | — | — | 0.1 | 0.1 |
| Water | — | — | 72.1 | 59.4 |

Formulations A and B produced good foam by the procedure described in Example 1. Formulations C and D were foamed in an Oakes Mixer ® Model No. 4MHA, and each produced foams having a density range of from 0.035 to 0.086 and from 0.068 to 0.079, respectively. Attempts to produce foams from formulations containing an oleate based softener, a mixture of polyethylene glycol 200 dioleate and glyceryl trioleate, were not successful. This points out the necessity of performing a small scale evaluation or trial prior to any plant run whenever a doubt exists about the effect of a particular compound on the foamability of a formulation.

EXAMPLE 9

In those instances in which a thickener may be desirable it would be important to known the amount thereof that could be used to provide a formulation that could be frothed to a foam of adequate stability and fast penetration properties. In this example it was observed that those formulations having a Brookfield viscosity below 75 cps. at 25° C. did produce satisfactory foams whereas those formulations having higher viscosities produced foams that were generally too stable for fast uniform penetration. Where fast penetration is not desired, however, foams produced from formulations having higher viscosities could be used. It was also observed that the thickeners should dissolve uniformly in the formulation to achieve their purpose; a carboxymethyl cellulose and an alginate thickener were not effective because they did not dissolve uniformly in this formulation. It is likely that they would be suitable thickeners in formulations containing functional textile treating compounds other than those specified in this instant example and in which they would be soluble. The basic formulation contained the following weight percent concentrations of components:

| | |
|---|---|
| DMDHEU | 73.8 |
| Zinc nitrate, 30% | 16.4 |

-continued

| | |
|---|---|
| Frothing Agent I | 1.1 |
| Softening Agent I | 8.2 |
| Wetting Agent I | 0.4 |
| Wetting Agent II | 0.1 |

To portions of this formulation, various amounts of hydroxyethyl cellulose or hydrolyzed guar gum thickeners were added and the viscosities, froth density and foam half-life of each modified formulation were determined. The formulations were foamed as decribed in Example 1 by mixing at high speed for five minutes. The Brookfield viscosities were determined at 10, 20, 50 and 100 rpms with the indicated spindle, at a temperature of 25° C. A wicking test was used to determine the penetrability of the foam through the fabric. In this test multiple layers of a 50/50 polyester/cotton fabric were placed in the surface of the foam and the length of time necessary for the first penetration of the foam through all the layers was reported. It was noted that thickener concentrations up to 0.25 weight percent could be used and good penetration and foam breakdown were obtained but that even better results were achieved at concentrations below 0.25 weight percent. At higher concentrations wettability or penetration of the foam was too slow for commercial use. The results are tabulated below:

TABLE A

| Applicator Head | | Foam Producing Conditions | | Foam Density gm/cc | Foam Penetration |
|---|---|---|---|---|---|
| Chamber Size cc | Slit Width in. | Press. psig | Speed RPM | | |
| 84 | .015 | 32 | Med | 0.056 | Poor |
| 84 | .035 | 32 | Med | 0.056 | Poor to Fair |
| 390 | .010 | 32 | Med | 0.056 | Excellent |
| 390 | .030 | 32 | Med | 0.056 | Excellent |
| 84 | .015 | 30 | Med | 0.046 | Poor |
| 84 | .035 | 30 | Med | 0.046 | Poor |
| 390 | .010 | 30 | Med | 0.046 | Excellent |
| 390 | .030 | 30 | Med | 0.046 | Excellent |
| 84 | 0.015 | 32 | Max | 0.050 | Poor |
| 84 | 0.015 | 12 | Max | 0.116 | Excellent |

The foam applicator head used in this example consisted of a foam application chamber and a nozzle orifice. The chamber had a length of about 12 inches, a width of about 1.5 inches and a height of about 1 or 1.5 inches. In the center of the base of the chamber there was located a foam inlet point through which the foam textile treating composition of this invention entered the chamber. Mounted at the top of the foam application chamber was the nozzle having an elongated slit or orifice running the length of the chamber; the slit could be adjusted in width. In this particular instance the slit depth was about 1.5 inches. The top edge of the lip of

| Thickener Concentration Added to Basic Formulation, % | Spindle No | Brookfield Viscosities cps | | | | Froth Foam Density (g/cc) | Seconds Half-Life (min:sec) | Wicking Test | | |
|---|---|---|---|---|---|---|---|---|---|---|
| | | RPM | | | | | | No of Layers | | |
| | | 10 | 20 | 50 | 100 | | | 2 | 3 | 4 |
| | | Hydroxyethyl Cellulose | | | | | | | | |
| 0.0 | 1 | 7 | 11 | 16.4 | 28.2 | 0.071 | 19:22 | 3 | 13 | 31 |
| 0.1 | 1 | 16 | 24 | 37.6 | 53.6 | 0.083 | 24:30 | 4 | 13 | 44 |
| 0.15 | 1 | 24 | 32 | 50.4 | 67.6 | 0.089 | 28:45 | — | — | — |
| 0.2 | 1 | 52 | 54 | 66.4 | 84.4 | 0.096 | 45:00 | — | — | — |
| 0.25 | 3 | 130 | 120 | 110 | 114 | 0.093 | 38:30 | 5 | 26 | 110 |
| 0.5 | 4 | 300 | 795 | 634 | 557 | 0.084 | 107:00 | 43 | 310 | 815 |
| 0.75 | 5 | 2,960 | 2,620 | 2,108 | 1,675 | 0.115 | 480:00 | — | — | — |
| 1.0 | 5 | 7,760 | 6,280 | 4,432 | 3,140 | 0.147 | — | 540 | 3,720 | 9,000 |
| | | Hydrolyzed Guar Gum | | | | | | | | |
| 0.0 | 1 | 4 | 9.5 | 16.2 | 22.9 | 0.078 | — | 2 | 8 | 29 |
| 0.1 | 1 | 13 | 15.5 | 26 | 38.9 | 0.081 | — | 5 | 17 | 56 |
| 0.25 | 3 | 60 | 75 | 78 | 84 | 0.075 | — | 22 | 87 | 255 |
| 0.50 | 4 | 460 | 390 | 320 | 272 | 0.078 | — | 78 | 353 | 3,720 |
| 1.00 | 4 | 77,200 | 48,900 | 27,200 | 17,440 | 0.063 | — | 375 | >7,200 | >7,200 |

EXAMPLE 10

A wash-wear formulation was prepared containing the following components:

| | |
|---|---|
| DMDHEU | 2,210 g. |
| Zinc nitrate, 30% | 492 g. |
| Softener I | 246 g. |
| Foaming Agent I | 32.4 g. |
| Wetting Agent I | 12.4 g. |
| Wetting Agent II | 3 g. |
| Direct Red 37, C.I. 22240 | 3.5 g. |

The above textile treating composition was metered to and foamed in a commercially available Oakes Mixer, Model No. 4 MHA. The foam produced was conveyed to the foam applicator heads hereafter described and applied to a cotton fabric passing over the nozzle orifice or slit of the foam applicator chamber at a speed of about 25 feet per minute to obtain a chemicals add-on of about 9 weight percent. The width of the orifice in the foam applicator chamber was varied; the details of this series of experiment are set forth in Table A below.

the nozzle tapered outwardly and downwardly at an angle of about 45° F. Two foam applicator heads were used differing in the size and shape of the chamber to which the nozzle was affixed. The first foam applicator head had a rectangular configuration when viewed from across the front and had a chamber volume of 390 cc, it measured about 12 × 1.5 × 1.5 inches. The second foam applicator head had a triangular configuration when viewed from the front with a chamber volume of about 84 cc. In this instance the base of the applicator head tapered at an angle from the center where the foam inlet means were located at a depth of one inch to a zero height at the two side ends of the chamber.

EXAMPLE 11

A wash-wear textile treating composition was prepared similar to that decribed in Example 10, but omitting Silicone Wetting Agent I. The textile composition had a solids content of 39.8 weight percent. It was foamed in a manner similar to that described in Example 10 to produce a foam having a foam density of between 0.05 and 0.06 gram per cc. This foam was applied to mercerized cotton broadcloth in the manner described in Example 10 with the fabric moving at a speed of 25 feet per minute over the nozzle. The nozzle slit was 25 mils wide and the chamber volume was 390cc. The solids add-on of the foam composition of this invention to the fabric was between 6 and 7 weight percent. After application of the foam composition to the textile fabric the textile fabric felt dry to the touch. The fabric samples treated with the foam of this invention were stored in a plastic bag until samples were removed for curing. At that time, swatches of the foam treated fabric were cured without an intermediate drying step on pin frames for periods of 10, 30, 60 and 90 seconds at temperatures of 320° and 360° F. In addition, at each temperature one sample was initially separately dried for 90 seconds at 300° F and then heated for 90 seconds at the indicated curing temperature treatment. Thus, the resulting samples compared a flash curing, that is without a intermediate drying step at various times and temperatures, with a series of samples in which the applied foam was initially dried and cured by the conventional procedures. The results are summarized in Table B. From the results it is shown that good wash-wear performance properties are obtained with the foams of this invention wherein the wash-wear treating formulation is continuously applied as a foam to one surface of the fabric. It can also be observed that the intermediate drying is not necessary to obtain good wash-wear performance properties with our foams and that such properties can be obtained in a short curing step at an appropriately high temperature of about 360° F. for about 30 to 60 seconds. The wash-wear properties of fabrics treated with our foams showed excellent durability of the applied reactant as evidenced by the fabric properties measured after 20 home laundering treatments.

a total solids of 43.5 weight percent. It was foamed in a commercially available Ease-E-Foamer, Model No. E1000, at a ratio of 16 volumes of air per volume of liquid and the thick foam produced had a density of 0.073 g/cc. Foam was produced at a feeding rate of 564 cc/min. of the liquid formulation to the foamer. The pressure on the foamer head was 20 psig. The foam was delivered to a foam applicator head and uniformly applied to one surface of a 50/50 polyester/cotton sheeting about 9 inches wide that weighed about 4 ounces per square yard. The fabric was travelling over the applicator nozzle orifice at a speed of 300 feet per minute for an MCT of 0.0011 second. Under these application conditions the pressure drop of the foam at the nozzle was 16.5 inches of water pressure drop across the fabric with an eight percent chemicals add-on of the formulation to the fabric.

The equipment used in the process consisted of suitable feed, take-up and guide rolls for the fabric; the foamer and means for delivering the foam to the applicator head; and the foam applicator head. The foam applicator head comprised a chamber having a foam inlet point centrally located in the base of the foam applicator nozzle mounted on the top. The internal chamber dimensions of the applicator head were about 9.5 inches long by about 1.75 inches wide by about 2 inches high, representing a total volume of about 33 cubic inches. The applicator nozzle consisted of a two-piece slotted head forming a nozzle orifice or slot extending along the length of the chamber. The slotted head, attached to the chamber body, had a taper of 45° for each lip exiting from the chamber, the lips defined a slot width of 0.064 inch, each lip had a height of 1.5 inches, and the exterior edge of the lips had an outward taper of 45°. The foam entered the chamber through the

TABLE B

| Treatment | | Properties | | | | | | | After 20 Home Launderings | |
|---|---|---|---|---|---|---|---|---|---|---|
| Cure Temperature °F. | Cure Time Secs. | Dry Wrinkle Recovery deg. | Wet Wrinkle Recovery deg. | Tear Strength g. | Tensile Strength g. | Wash-Wear Tumble dry | Spin dry | Yellowness Index | Dry Wrinkle Recovery deg. | Wash-Wear Tumble Dry |
| 320 | 10 | 166 | 180 | 2112 | 27 | 1.1 | 1.2 | .036 | 182 | 1.0 |
|  | 30 | 253 | 183 | 1856 | 21 | 1.5 | 2.8 | .037 | 204 | 2.2 |
|  | 60 | 267 | 188 | 1616 | 17 | 2.9 | 2.4 | .036 | 247 | 3.2 |
|  | 90 | 265 | 234 | 1520 | 17 | 3.3 | 3.1 | .038 | 251 | 3.4 |
|  | Control[x] | 279 | 222 | 1248 | 19 | 3.7 | 3.7 | .039 | 254 | 3.5 |
| 340 | 10 | 190 | 189 | 2160 | 26 | 1.2 | 1.2 | .037 | 183 | 1.2 |
|  | 30 | 246 | 211 | 1680 | 19 | 2.8 | 2.4 | .039 | 222 | 3.0 |
|  | 60 | 259 | 218 | 1552 | 17 | 3.1 | 2.4 | .042 | 227 | 3.0 |
|  | 90 | 286 | 222 | 1376 | 18 | 3.3 | 2.8 | .041 | 253 | 3.4 |
|  | Control[x] | 278 | 225 | 1520 | 18 | 3.2 | 2.6 | .044 | 244 | 3.2 |
| 360 | 10 | 227 | 178 | 2112 | 23 | 2.0 | 1.6 | .036 | 176 | 1.3 |
|  | 30 | 279 | 240 | 1520 | 20 | 3.0 | 1.8 | .040 | 208 | 2.3 |
|  | 60 | 286 | 247 | 1200 | 15 | 3.5 | 3.1 | .045 | 261 | 3.5 |
|  | 90 | 288 | 247 | 1232 | 14 | 3.6 | 3.3 | .043 | 261 | 3.5 |
|  | Control[x] | 274 | 253 | 1264 | 15 | 3.4 | 2.9 | 0.42 | 273 | 3.4 |

[x]Control indicates samples were dried 1.5 minutes at 300° F. and cured at indicated cure temperature for 1.5 minutes to typify conventional curing conditions. All samples other than these marked control were not thermally dried.

EXAMPLE 12

A wash-wear formulation was prepared containing the following components, in weight percentages:

| DMDHEU | 80.4% |
|---|---|
| Zinc nitrate, 30% | 17.9% |
| Foaming Agent I | 1.2% |
| Wetting Agent I | 0.4% |
| Wetting Agent II | 0.1 |

The liquid formulation included a trace amount of a commercial tracer dye, it had a density of 1.18 g/cc and inlet point in the base, filled the chamber at a positive pressure, exited from the chamber through the slot of the foam applicator nozzle, and contacted the fabric and was absorbed by it at the applicator nozzle lips. The fabric moved across and contacted both exterior lips of the foam applicator nozzle at the indicated speed of 300 feet per minute. Uniform application of the foam on the fabric was observed.

EXAMPLE 13

A wash-wear formulation was prepared containing the following components, in weight percentages, and a tracer dye:

| DMDHEU | 76.0% |
| --- | --- |
| Zinc Nitrate, 30% | 15.1% |
| Softener I | 7.6% |
| Wetting Agent I | 0.3% |
| Foaming Agent I | 0.9% |
| Wetting Agent II | 0.1% |

The liquid formulation had a density of 1.18 g/cc and a total solids content of 43.5 weight percent and also contained a tracer dye. Foam was produced using the same equipment described in the immediately preceding example at a ratio of 25 volumes of air per volume of liquid formulation; the foam produced had a density of 0.048 g/cc. The pressure on the foamer head and lines to the applicator head was 18 psig. The foam was applied to one surface of a 65/35 polyester/cotton sheeting fabric that was 48 inches wide and weighed about 4 ounces per square yard using modified commercially available tenter frame and feeder means to convey the fabric across the foam applicator nozzle and subsequently cure the formulation. Fabric speed was maintained at 30 feet per minute for an MCT of 0.0053 second. To insure proper cure in the pilot scale pin tenter dryer, a limitation on the speed was imposed by the equipment. Contact time in the tenter frame dryer was 42 seconds at 360° F. Tension on the fabric was maintained by nip roll and idler roll means. Improved results were noted in this experiment when idler rolls were located on each side of the applicator nozzle slot about 6 inches below the top of the applicator nozzle lips and about 12 inches from the center of the nozzle orifice. The add-on of foamed chemical formulation was eight percent.

The apparatus used to apply the foam was a larger version similar to that described in Example 12 and contained a foam distribution plate in the internal chamber. The total inside chamber dimensions were 60 inches long by 2.25 inches wide by 7 inches high at the foam inlet end and 5 inches high at the opposite end. The foam distribution plate was located across the entire width and length of the chamber, at a point 4 inches from the top of the chamber. This foam distribution plate had 61 openings, each 0.07 inch in diameter, uniformly located thoughout its surface and divided the applicator head into a lower foam distribution chamber and an upper foam application chamber. The foam entered the foam distribution chamber at the end having the greatest height, passed through the openings in the foam distribution plate into the foam application chamber to give a uniform rise of the foam into the foam application chamber and then through the nozzle orifice to the fabric surface. The slot in the nozzle orifice was 0.032 inch wide and 2 inches high. Under the conditions stated, the pressure drop of the foam across the foam distribution plate was 4 inches of water pressure. It was observed that a uniform application of the foam to the fabric was obtained.

EXAMPLE 14

A formulation was prepared containing the following components in weight percentages:

| DMDHEU | 80.4% |
| --- | --- |
| Zinc Nitrate, 30% | 17.9% |
| Foaming Agent I | 1.2% |
| Wetting Agent I | 0.4% |
| Wetting Agent II | 0.1% |

The liquid formulation included a tracer dye; it had a density of 1.18 g/cc and a total solids of 43.5 weight percent. Foam was produced by several different procedures using different commercially available foam producing equipment. An Oakes Mixer, Model 4MHA, was used running the rotor at 1,740 rpm and a pressure of 30 psig and then at 740 rpm and a pressure of 16 psig to produce foams having a density of 0.09 g/cc. The liquid formulation was fed at the rate of 564 cc/minute and the ratio of air to liquid was about 13:1 by volume. It was observed that the bubbles produced when the Oakes Mixer was operated at 740 rpm were larger than those when produced when it was operated at 1,740 rpm. The second commercially available foamer used was the Ease-E-Foamer, Model M 1000, operated at 410 rpm and a pressure of 20 psig; this produced a foam having a density of 0.092 g/cc. The foam bubbles produced in this instance were slightly larger than those produced using the Oakes Mixer. The foams were applied to one surface of a 65/35 polyester/cotton sheeting fabric by the procedure described in Example 12 using the same application equipment therein described. The nozzle slit width was 1 inch. The fabric was travelling over the applicator nozzle at a speed of 300 feet per minute for an MCT of 0.0167 second. Application uniformity was superior with the foam produced using the Ease-E-Foamer and the foam produced using the Oakes Mixer operated at 740 rpm. Some non-uniformity was observed on application of the foam produced with the Oakes Mixer operated at 1,740 rpm; this non-uniformity was attributed to the smaller bubble size obtained.

EXAMPLE 15

A formulation was prepared containing the following components in weight percentages:

| DMDHEU | 81.2% |
| --- | --- |
| Zinc Nitrate, 30% | 17.9% |
| Wetting Agent IV | 0.6% |
| Foaming Agent I | 0.3% |

The liquid formulation had a density of 1.18 g/cc. and a total solids of 43.5 weight percent. Foams were produced using a commercially available Ease-E-Foamer operating at 410 rpm at ratios of 10, 13 and 20 volumes of air per volume of liquid. The foams produced had the densities indicated in Table II. The foam was delivered to an applicator nozzle and uniformly applied to the surfaces of three different fabrics, a 65/35 polyester/cotton (Fabric A), a 50/50 polyester/cotton (Fabric B) and a 100 percent cotton (Fabric C) at an add-on of 6 weight percent. In this series the rate at which the fabric was traveling was varied at 100, 200 and 300 feet per minute over the applicator nozzle to determine the balance point between ECT and MCT at wide orifice openings. In addition, the width of the slit of the applicator nozzle was varied at 1 inch, 3 inches and 4 inches using modified foam applicator heads. At these applicator nozzle slit widths, it was found that good application was obtained under these specific conditions. It was also observed that the foam begins to roll in the applicator nozzle and develops a rolling bank at high speeds and wide nozzle openings, as well as a change in the foam structure.

The applicator heads used in this example were constructed so that the width of the applicator nozzle could be varied over a wide range. The basic structure was similar to that described in Example 13 in that it consisted of a foam distribution chamber and a foam application chamber separated by the foam distribution plate at a height of one inch above the base. Applicator Head A had a foam distribution chamber measuring 9 inches long by 1 inch in height by 3 inches in width and a foam application chamber measuring 9 inches long by 3 inches in height with the nozzle orifice width adjustable to from 0.25 to 3 inches. The foam distribution plate had 17 holes, each ⅜ inch in diameter. In Application Head B the foam distribution chamber was 6 inches wide and the foam application chamber could be adjusted to a nozzle orifice up to six inches in width; this head had the same number and size of holes. The nozzle orifice width was equal to the selected adjusted width of the foam application chamber and selection was made by adjusting the location of one of the nozzle lips, the two nozzle lips forming two longitudinal sides of the foam application chamber. Applicator Head B was used when the nozzle orifice width was greater than 3 inches. During application of the foam to the fabric, the fabric was in contact with both nozzle lips. The conditions under which the fabrics were treated are summarized in the following table wherein the nozzle orifice slit width and water pressure are reported:

TABLE III

| | Nozzle Slit Width, Inches and (Water Pressure, Inches) | | | Foam |
|---|---|---|---|---|
| Fabric | At 100 fpm | At 200 fpm | At 300 fpm | Density, g/cc |
| A | 1/4 (—) | 1/4 (1/4) | 3 (1/4) | 0.12 |
| B | 1/4 (3/4) | 1/2 (1) | 3 (5/8) | 0.12 |
| C | 1/2 (2) | 1/4 (1) | 3 (1 1/2) | 0.12 |
| A | 1/4 (1) | 1/4 (2 1/4) | 3 1/4 (1 1/2) | 0.09 |
| B | 1/2 (3/2) | 1/2 (1 1/2) | 3 1/4 (1 3/8) | 0.09 |
| C | 3/4 (2) | 3/4 (1 5/8) | 3 1/4 (1 3/4) | 0.09 |
| A | 1/2 (1 1/2) | 1 1/2 (1 1/2) | 4 (5/8) | 0.06 |
| B | 3/4 (5/8) | 1 1/2 (1 1/4) | 4 (1) | 0.06 |
| C | 1 (2) | 1 1/2 (1 1/2) | 4 (1/4) | 0.06 |

EXAMPLE 16

A wash-wear formulation was prepared containing the following components in weight percentages:

| | |
|---|---|
| DMDHEU | 81.2% |
| Zinc Nitrate, 30% | 17.9% |
| Wetting Agent IV | 0.6% |
| Wetting Agent I | 0.3% |

The liquid formulation had a density of 1.18 g/cc. and a total solids content of 43.5 weight percent. Foam was produced in a commercially available Ease-E-Foamer, at a ratio of about 13 and 6 volumes of air per volume of liquid, with the foamer operated at 410 rpm. The combination of wetting agents served the dual function of foaming agent and wetting agent. Satisfactory foam was produced having a half-life of about 15 minutes and densities of 0.089 g/cc. and 0.2 g/cc., respectively. The foam was applied using a foam applicator head 9 inches long by 2.5 inches in height. The two sides were spaced 1 inch apart and the tops tapered at an angle of 45°. The longitudinal space between the sides defined the nozzle orifice or gap. Foam was introduced into the nozzle applicator through the base and fabric was moved across the nozzle orifice at a speed of 100 feet per minute for an MCT of 0.005 second. Excellent uniformity of application was observed.

EXAMPLE 17

A formulation was prepared containing the following components in weight percentages:

| | |
|---|---|
| DMDHEU | 81.2% |
| Zinc Nitrate, 30% | 17.9% |
| Wetting Agent IV | 1.2% |

Attempts to produce a foam by the procedure followed in the immediately preceding example resulted in a foam that had a density of 0.48 g/cc. The high density of this foam made it unsatisfactory and it could not be uniformly applied by the process of this invention. In this example Wetting Agent IV by itself was shown not to be an adequate foaming agent.

EXAMPLE 18

Two formulations were prepared as follows:

| | A | B |
|---|---|---|
| DMDHEU | 81.2 | 81.2 |
| Zinc Nitrate, 30% | 17.9 | 17.9 |
| Foaming Agent I | 0.3 | 0.6 |
| Half-life, Minutes | — | 26 |

These formulations were foamed in the manner similar to that described in Example 16. Formulation A did not produce a satisfctory foam, its density was 0.41 g/cc. Formulation B produced a satisfactory foam having a bubble size of 0.243 mm and a density of 0.04 g/cc. when the foamer was operated at 210 rpm. Using the procedure and foam application head described in Example 16, the foam from formulation B was applied to 50/50 polyester/cotton sheeting fabric at a 9 percent add-on and a speed of 300 feet per minute. Uniform application was achieved on the polyester/cotton. When the foamer was operated at 485 rpm, the foam produced, though it had the same density, had a bubble size of 0.043 mm., and it would not apply uniformly.

EXAMPLE 19

Two formulations were prepared containing the following components:

| | A | B |
|---|---|---|
| DMDHEU | 81.2 | 81.2 |
| Zinc Nitrate, 30% | 17.9 | 17.9 |
| Foaming Agent I | 1.2 | 1.2 |
| Wetting Agent II | 0.1 | — |

These formulations were foamed in the manner similar to that described in Example 16. In both instances satisfactory foam was produced having a density of 0.09 g/cc. The formulation containing Wetting Agent II produced foam that had a foam half-life of 14 minutes, while the foam half-life of the foam that did not contain the silicone was 10 minutes.

EXAMPLE 20

Two formulations were preprared containing the following components in weight percentages:

|  | A | B |
|---|---|---|
| DMDHEU | 81.2 | 81.2 |
| Zinc Nitrate, 30% | 17.9 | 17.9 |
| Wetting Agent IV | 0.6 | 0.6 |
| Frothing Agent III | 0.3 | 0.3 |
| Zonyl FSN (Perfluoro-alkyl Surfactant) | 0.5 | — |

Foams were produced by the procedure similar to that described in Example 16. The foam produced with formulation A had a density of 0.09 g/cc. and a half-life of 5.5 minutes. The foam produced with formulation B had a density of 0.09 g/cc. and had a half-life of 21 minutes. Application of the two foams produced on 50/50 polyester/cotton and 100 percent cotton sheeting fabric resulted in good uniform distribution of the composition. The foam was applied using the procedure and equipment described in Example 16.

EXAMPLE 21

A series of formulations was prepared differing in the amount of thickener added. The constant components in the formulations were as follows:

| DMDHEU | 81.2 |
|---|---|
| Zinc Nitrate, 30% | 17.9 |
| Wetting Agent IV | 0.6 |
| Frothing Agent I | 0.3 |

Formulation A did not contain any thickener and had a Brookfield viscosity of 5.2 cps at 23° C. Formulation B contained 0.1 percent hydroxyethyl cellulose (which in a one percent solution had an LVT Brookfield viscosity of about 3,000 cps at 25° C using a No. 3 spindle at 30 rpm) and had a Brookfield viscosity of 15.7 cps at 23° C. Formulation C contained 0.2 percent of the same hydroxyethyl cellulose and had a Brookfield viscosity of 30.4 cps at 23° C. Formulation D contained 0.3 percent of the same hydroxyethyl cellulose and had a Brookfield viscosity of 83.1 cps at 23° C. These formulations were foamed as described in Example 16 to produce foams having a density of 0.045 g/cc., and the foams were applied to 4 ounce 65/35 polyester/cotton and 100 percent cotton sheeting fabrics. The foam applicator head used was similar to that described in Example 15; it had a foam distribution chamber measuring 9 by 2 by 2 inches and a foam application chamber measuring 9 by 2 by 0.75 inches. The nozzle orifice was therefor 0.75 inch wide. The foam distribution plate had 15 holes, each 3/16 inch in diameter. The inward taper on the downstream lip of the nozzle orifice was 5°. The add-on at a fabric speed of 300 feet per minute was six weight percent. The uniformity of application was good for formulations A to C inclusive and fair for formulation D.

EXAMPLE 22

A formulation was prepared containing the following components:

| DMDHEU | 81.2 |
|---|---|
| Zinc Nitrate, 30% | 17.9 |
| Wetting Agent IV | 0.6 |
| Foaming Agent I | 0.3 |

The liquid formulation had a density of 1.18 g/cc and a total solids content of 43.5 weight percent. Foam was produced using the Ease-E-Foamer by feeding 188 cc per minute of the formulation into the foamer with sufficient air to produce a foam that had a density of 0.02 g/cc while operating the foamer at 410 rpm. The foam was applied to the surface of a 50/50 polyester/cotton sheeting fabric at an add-on of 3 percent using the apparatus described in Example 21 but using a nozzle orifice width of 1-3/16 inches. The inward taper on the downstream lip was 5°. Application to the fabric was at a fabric speed of 300 feet per minute and a pressure drop of 0.25 inch water pressure across the fabric. Good uniform application was achieved.

EXAMPLE 23

The effect of pre-wetting the fabric with 60 percent water followed by use of the foams of this invention was evaluated in this example. A formulation was prepared containing the following components in weight percent:

| DMDHEU | 80.9 |
|---|---|
| Zinc Nitrate, 30% | 17.9 |
| Wetting Agent IV | 0.6 |
| Frothing Agent III | 0.6 |

This formulation was foamed using the Ease-E-Foamer operating at 410 rpm and a feed of 125 cc per minute. The foam had a foam density of 0.06 g/cc. This was applied to the pre-wet cotton sheeting using the apparatus described in Example 21 and a nozzle orifice opening of 0.5 inch at a fabric speed of 300 feet per minute. Uniform application of the foam was achieved on the pre-wet fabric and the pressure drop across the fabric was 0.5 inch of water pressure. When the same foam was applied to the same fabric that had not been pre-wet, the pressure drop across the fabric was 2⅝ inches of water pressure.

EXAMPLE 24

A formulation was prepared containing the following components in weight percent:

| DMDHEU | 81.2 |
|---|---|
| Zinc Nitrate, 30% | 17.9 |
| Wetting Agent IV | 0.6 |
| Foaming Agent I | 0.3 |

This formulation was foamed in an Ease-E-Foamer with the rotor operating at 410 rpm using a formulation feed of 564 cc per minute and a ratio of about 15 volumes of air per volume of formulation. The foam produced had a density of 0.078 g/cc. This foam was applied to an 8 ounces per square yard, 50/50 polyester/cotton fabric sheeting at a fabric speed of 300 feet per minute at an add-on rate of 4.5 percent under the same conditions described in Example 22 with a nozzle orifice opening of 1-3/16 inches. Excellent uniformity was observed. The pressure drop across the fabric was 2⅞ inches of water.

EXAMPLE 25

A dye formulation was prepared containing the following:

| Latyl Orange 2 GFS (C.I 44) | 6.8 lb. |
|---|---|
| Water | 36.4 lb. |
| Wetting Agent IV | 0.4 lb. |

| -continued | |
|---|---|
| Frothing Agent III | 0.4 lb. |

The pH was adjusted to 5–6 with acetic acid and two foams were produced having different foam densities using the Ease-E-Foamer with the rotor operating at 340 rpm:

| Foam | A | B |
|---|---|---|
| Density, g/cc | 0.03 | 0.057 |
| Half-life, min | — | 5 |
| Liquid feed to foamer c/c min | 125 | 125 |

The foams were applied to 100 percent polyester and to 65/35 polyester/cotton sheeting fabric using the applicator head described in Example 21 with the nozzle orifice adjusted to a gap width between nozzle lips of 0.5 inch. The fabric was moving at a speed of 100 feet per minute across the orifice, contacting both lips of the nozzle, total wet add-on was 14 weight percent.

When applying Foam A to the 100 percent polyester, sections of the nozzle opening were blocked with tape and a striped pattern was obtained on the fabric. The foam, as in other examples, was uniformly applied to the fabric, leaving the fabric essentially dry to the touch. After standing for a period of time, the striped fabric was heated at 420° F for 3 minutes to fix the dye. Clear definition of the pattern was obtained. In a similar manner, the entire fabric surface was dyed by removing the tape from the nozzle.

Foam A was used to apply a pattern to 65/35 polyester/cotton with the same equipment. The pattern effect was attained by positioning a stencil between the nozzle and fabric, the stencil moving at the same rate as the fabric, as the foam exited from the nozzle orifice. The dyed areas of the fabric were uniform and even, and clear definition of the dyed areas was noted.

Foam B was applied to 100 percent polyester in the same manner to completely dye the fabric. Uniform application and even dyeing were observed. A section of the fabric was sprinkled with water after the foam was applied, the fabric taken up on a roll, stored about 48 hours, and the dye was then fixed at about 420° F for 3 minutes, a random pattern was observed showing lighter areas where the water droplets were deposited. In all instances a scour after dye fixation is recommended.

EXAMPLE 26

A combination wash-wear and dye formulation was prepared containing the following:

| DMDHEU | 24,270 g |
|---|---|
| Zinc Nitrate, 30% | 5,370 g |
| Wetting Agent IV | 180 g |
| Frothing Agent III | 180 g |
| Latyl Orange 2 GFS | 3,540 g |

A portion of the above formulation was diluted with 25 percent water, the pH adjusted to 5–6 and a foam was produced as described in Example 25, having a density of 0.046 g/cc and a foam half-life of about 9.4 minutes, by feeding 376 cc/min of the formulation to the foamer and using an air to liquid ratio of about 25:1. The foam was applied to 65/35 polyester/cotton fabric using the equipment nozzle orifice opening described in Example 25. The fabric was moving at a speed of 300 feet per minute, for an MCT of 0.008 second. The add-on to the fabric was 4.5 weight percent of DMDHEU and 1.5 weight percent of dye. When the fabric was entirely dyed, uniform application and even dyeing were noted. The foam-treated fabric was subsequently cured at 420° F for 3 minutes. The same foam was used to print a pattern on the cloth by the procedure described in Example 25. Clear definition was obtained. The data illustrates that one can apply several treatments, in this case both wash-wear and dyeing, simultaneously and without intermediate drying steps. Scouring after dye fixation is recommended to improve crocking and wet fastness properties, and remove any loose dye from the fabric.

EXAMPLE 27

A dye formulation was prepared containing the following:

| Latyl Orange 2 GFS | 5.6 lb. |
|---|---|
| Water | 36.4 lb. |
| Wetting Agent IV | 2.1 lb. |
| Frothing Agent III | 0.4 lb. |
| Wetting Agent II | 0.04 lb. |
| Hydroxyethyl Cellulose* | 0.04 lb. |

*Same as described in Example 21.

The pH of the formulation was adjusted to 5–6 with acetic acid and foam was produced using the Ease-E-Foamer as in Example 26. The foam had a density of 0.075 g/cc. It was applied to 65/35 polyester/cotton using the same procedures and equipment used in Example 26 for an add-on of 1.5 weight percent dye. Application uniformity was excellent and an evenly dyed fabric was obtained, both before and after dye fixation by heating at 420° F for 3 minutes.

A portion of the dye formulation was diluted with five times its weight of water. This was padded onto the fabric and dye migration evaluated by AATCC Test Method 140-1974. For comparative purposes a swatch of the foam treated fabric, taken immediately after the foamed dye formulation had been applied to it, was also evaluated for dye migration. It was observed that the fabric treated with the concentrated dye formulation with the foam of this invention showed essentially no dye migration, whereas the fabric treated with the diluted and padded formulation showed excessive and pronounced dye migration. The values obtained from the test procedure were 4 and 48.8%, respectively.

What is claimed is:

1. A froth composition for continuously and directly surface treating a fabric or paper substrate, said composition being a froth having a foam density of from 0.005 to 0.3 gram per cc, an average foam bubble size of from 0.05 to 0.5 millimeters in diameter and a foam half-life of from 1 to 60 minutes, said foam composition comprising from 5 to 75 weight percent of functional textile treating compound, from 0.2 to 5 weight percent of frothing agent, from 0 to 5 weight percent of wetting agent, with the balance of said composition being water, said percentages based on the weight of said foam composition; said foam further characterized in that it immediately breaks on contact with said substrate and is rapidly absorbed thereby to leave the surface thereof essentially dry to the touch.

2. A froth as claimed in claim 1, wherein the foam density is from 0.01 to 0.2 gram per cc, the average foam bubble size is from 0.08 to 0.45 millimeters, the foam half-life is from 3 to 40 minutes, the functional treating chemical compound is present at a concentration of from 10 to 60 weight percent and the frothing agent is preset at a concentration of from 0.4 to 2 weight percent.

3. A froth as claimed in claim 1, wherein the functional treating chemical compound is 1,3-dimethylol-4,5-dihydroxy-2-imidazolidone.

4. A froth as claimed in claim 1, wherein the functional treating chemical compound is a dye.

5. A froth as claimed in claim 1, wherein the frothing agent is the adduct of 20 moles of ethylene adduct with one mole of mixed $C_{11}$ to $C_{15}$ linear secondary alcohols.

* * * * *